Figure 1:
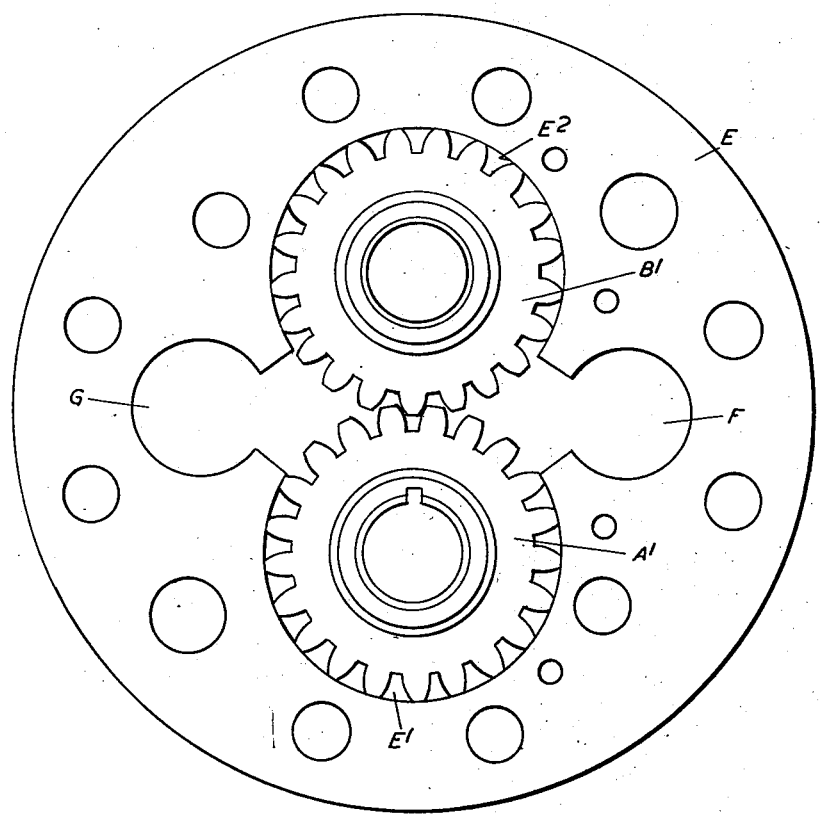

July 22, 1952     E. H. JOHNSON     2,604,051
ROTARY PUMP

Original Filed Oct. 30, 1946     2 SHEETS—SHEET 1

Inventor
Edward H. Johnson
By Emery Holcombe & Blair
Attorneys.

July 22, 1952 E. H. JOHNSON 2,604,051
ROTARY PUMP
Original Filed Oct. 30, 1946 2 SHEETS—SHEET 2

Inventor
Edward H. Johnson
By Emery, Holcombe & Blair
Attorney

Patented July 22, 1952

2,604,051

UNITED STATES PATENT OFFICE 2,604,051

ROTARY PUMP

Edward Harry Johnson, Coventry, England, assignor to The Keelavite Company Limited, Coventry, England, a company of Great Britain Continuation of application Serial No. 706,645, October 30, 1946. This application January 26, 1948, Serial No. 4,281. In Great Britain December 14, 1945

7 Claims. (Cl. 103—126)

This application is a continuation of my U. S. patent application Serial No. 706,645 filed October 30, 1946 (and subsequently abandoned) for improvements in rotary pumps and relates to pumps of the gear wheel type. The invention may be applied to pumps either of the usual simple type comprising two gear wheels, or of the multiple type comprising for example three gear wheels, although the invention will for simplicity be described with particular reference to pumps of the normal simple two-gear-wheel type. Thus it is to be understood that where two gear wheels are referred to hereinafter, these may where appropriate, be either the two gear wheels of a simple two-gear-wheel pump, or may be two of the intermeshing gear wheels of a gear wheel pump comprising three or more gear wheels.

One of the problems in gear wheel pumps, particularly when intended for operation at comparatively high pressure, has been to prevent the occurrence of excessive pressures in the spaces between the intermeshing teeth due to the trapping of liquid in these spaces as the teeth come into mesh, followed by the reduction in volume of the closed spaces thus formed as the teeth move in their intermeshed state. Further the higher the pressures for which the pump is intended, the closer and more perfectly controlled must be the clearances, and the more desirable it becomes to avoid the reduction in sealing which is inseparable from the provision of relief recesses or passages in the end walls of the pump chamber as have been commonly used in the past to receive the liquid forced from the closed spaces. Moreover, such relief recesses have to be specially made and carefully shaped to keep the increased leakage across the gear wheels and the consequent loss of efficiency down to a minimum.

It has been proposed to provide relief grooves in the idle flanks of the teeth of one of the gears, that is to say, the flanks which are normally separated from the adjacent flanks of the intermeshing teeth of the other gear by a space representing the backlash of the gears, so as to facilitate the escape of liquid from between the teeth as they come into mesh, but this or increasing the backlash between the gears for a similar purpose does not solve the problem since irrespective of effective clearance between the idle flanks of the intermeshing teeth, a closed space is formed between adjacent pairs of engaging driving flanks, hereinafter termed the sealing flanks, and these must form as perfect a seal as possible to prevent backflow through the intermeshing teeth.

The object of the present invention is to provide a pump of the kind in question, in which the occurrence of high pressures in the spaces between adjacent pairs of co-operating sealing flanks will be substantially reduced or avoided in a simple and efficient manner lending itself readily to production, and with as little loss of volumetric efficiency as possible, so that a satisfactory pump for operation at high pressures can be provided.

To this end, in a gear wheel pump according to the present invention, the compression of liquid in the spaces between adjacent lines of sealing contact of the intermeshing teeth is reduced or prevented by cropping the teeth of the driven gear wheel, leaving them otherwise of the normal involute form for a gear of the diameter which the gear would have in its uncropped form, while the teeth of the driving gear are uncropped. In theory compression of liquid in the spaces referred to will be completely avoided only if the teeth of the driven gear are cropped to such an extent that the sealing flanks of any pair of teeth do not come into sealing engagement with one another until the line of sealing engagement of the preceding pair of sealing flanks reaches or passes the point at which the two pairs of sealing flanks are equidistant from the plane which is common to the axes of rotation of the two gears that is to say, the point at which, disregarding backlash, the idle flanks lying between the two pairs of sealing flanks meet at the plane which is common to such axes of rotation. In practice it may not, however, be necessary to crop the teeth of the driven gear to the full extent theoretically required fully to achieve this result because of the partial relief afforded by the necessary backlash, and in fact it may be advantageous in some cases to crop the teeth of the driven gear only to the extent required to relieve the compression sufficiently for practical purposes, thus leaving a greater degree of overlap than would otherwise be the case between the periods of engagement of adjacent pairs of sealing flanks and hence tending to provide better sealing across the intermeshing teeth. The cropping may, for example, be only such that a following pair of sealing flanks does not come into engagement until the preceding pair of idle flanks lies a small distance in advance of the plane which is common to the axes of rotation of the two gears but such distance should not exceed that represented by 2° of gear wheel rotation.

The references to the teeth of the driven gear being cropped are to be understood as meaning that the tips of the teeth are cut away by reducing the overall diameter of the gear while leaving the teeth otherwise of the form they would have without such reduction in diameter. Further the cropping may be effected either by appropriately reducing the diameter of the blank from which the gear is cut before cutting the teeth or by reducing the overall diameter of the gear after cutting the teeth or at an intermediate stage or partly by one or more of these methods.

Generally the two gears will have the same number of teeth so that the toothed parts of the gears are of substantially identically the same form except that the teeth of the driven gear are cropped by reducing its overall diameter.

It will thus be seen that in such an arrangement, as applied to a simple two-gear-wheel pump, the two gears can be cut to the same pattern, but on slightly different diameter blanks, while the only departure from standard in the pump casing need be that that one of the two intersecting bores constituting the pump chamber which houses the driven gear will be slightly smaller in diameter than the other.

Further this is achieved without calling for any departure from standard gear-manufacturing methods, or for the provision of relief recesses which tend to reduce the efficiency and entail additional precision manufacturing operations.

The exact form of the pump to which the invention is applied may vary considerably, and the details of construction form no part of the present invention. One example of the present invention is illustrated, however, in the accompanying drawings as applied to a simple form of pump, Figure 1 being a cross section through the pump casing and gear wheels in a plane at right angles to their axes of rotation while Figure 2 shows on an enlarged scale the intermeshing parts only of the gear wheels in a manner illustrating how the invention operates to prevent the compression of liquid between adjacent lines of sealing contact between intermeshing teeth sufficiently for practical purposes.

As will be seen from Figure 1 the pump comprises essentially a casing E containing an inlet port F and an outlet port G communicating with opposite sides of a working chamber in which are mounted two gear wheels $A^1$ and $B^1$, the tips of the teeth of each of which make a substantially fluid type seal with the bores of the parts $E^1$, $E^2$ of the chamber in which the gear wheels respectively lie.

Figure 2:
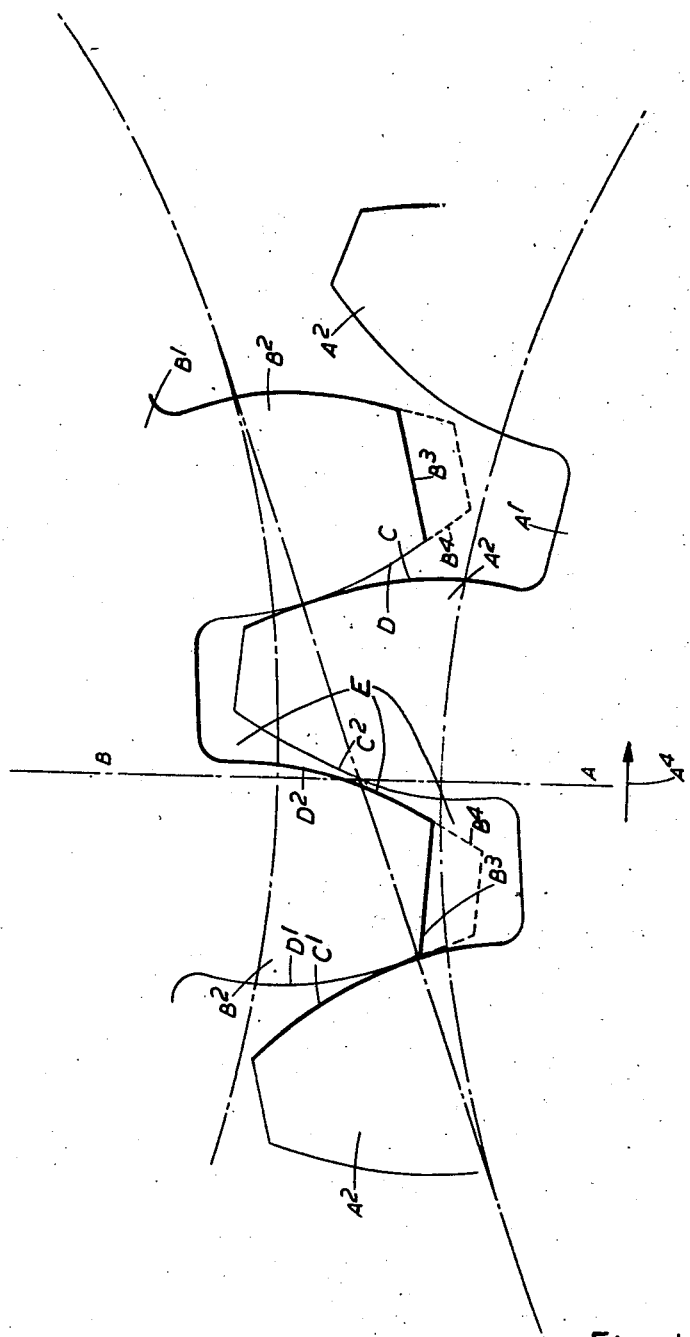

Referring to Figure 2 the line A, B joins the axes of rotation of the driving gear wheel $A^1$ and the driven gear wheel $B^1$ and thus represents the plane common to these two axes. It will be seen that whereas the teeth $A^2$ of the gear wheel $A^1$ are of standard full form, the teeth $B^2$ of the gear wheel $B^1$, while being of standard form, are cropped as indicated at $B^3$ by reducing the diameter of the gear wheel. To illustrate this more clearly the full form which the teeth $B^2$ would have without such cropping is indicated in dotted lines at $B^4$.

In the arrangement shown the gear wheels are of the same pitch diameter but it will be understood that the intersecting bores $E^1$, $E^2$ constituting the parts of the pump chamber in which the two gear wheels respectively lie will be of different diameters so as to provide only the necessary working clearance between the tips of the teeth and these bores.

The direction of rotation of the driving gear A is shown by the arrow $A^4$. The gears are shown in the position in which the sealing flanks $C^1$, $D^1$ are just coming into engagement or have just come into engagement and it will be seen that the point of sealing engagement between these two flanks and the point of sealing engagement of the preceding pair of sealing flanks C, D are equidistant from the plane A—B common to the axes of rotation of the two gear wheels. As indicated above, the flanks $C^1$, $D^1$ may come into engagement slightly before the point shown, but preferably not by an amount exceeding that represented by two degrees of gear wheel rotation.

It will also be seen from an examination of what the condition would have been in the position shown if the teeth $B^2$ had the normal full form indicated by the dotted line $B^4$, that the sealing flanks $C^1$, $D^1$ would then have been in engagement for a considerable time and considerable compression of the liquid in the space E between the sealing flanks C, D and $C^1$, $D^1$ would therefore have tended to occur.

It is to be understood that the invention may be applied to gear wheel pumps having gears either of the same pitch diameter or of different pitch diameters but that in each case the form of the teeth will be standard apart from the cropping of the teeth of the driven gear according to the invention.

What I claim as my invention and desire to secure by Letters Patent is:

1. A gear wheel pump including in combination a casing having inlet and outlet ports, driving and driven gear wheels intermeshing with backlash within the casing and extending across the casing between the ports and each having teeth the circumferential tip surfaces of all of which make substantially fluid-tight seals with the adjacent parts of the wall of the casing while both flanks of each tooth are true involute surfaces extending to meet the circumferential tip surface, the teeth of the driven gear wheel being of the same pitch as those of the driving gear wheel and radially cropped at their ends with respect to the length of the teeth of the driving gear wheel to provide circumferential part-cylindrical tip surfaces which conform to the circumference of a circle concentric with the center of rotation of the driven gear wheel and of smaller diameter than the outer circumference of a normal gear wheel of the same number of teeth so as to delay the point at which the sealing flanks of each pair of teeth come into engagement with one another and thereby reduce or eliminate the compression of liquid in the spaces between adjacent pairs of engaging sealing flanks.

2. A gear wheel pump including in combination a casing having inlet and outlet ports, driving and driven gear wheels intermeshing with backlash within the casing and extending across the casing between the ports and each having teeth the circumferential tip surfaces of all of which make substantially fluid-tight seals with the adjacent parts of the wall of the casing, the flanks of each tooth being true involute surfaces extending to the edges of the circumferential tip surfaces and the teeth of the driven gear being of the same pitch as those of the driving gear wheel and radially cropped at their ends with respect to the length of the teeth of the driving gear wheel to reduce the overall diameter of the driven gear wheel with respect to a normal gear wheel of the same number of teeth and to provide circumferential part-cylindrical tip surfaces conforming to the circumference of a circle concentric with the center of rotation of the driven gear wheel and so as to delay the point at which the sealing flanks of each pair of teeth come into engagement with one another in their rotational movement until the mid-point of the narrowest part of the gap representing back lash between the preceding pair of idle flanks in their rotational movement has passed a point in advance of the plane which is common to the axis of rotation of the two gear wheels by a distance not more than that represented by 2° of gear wheel rotation.

3. A gear wheel pump as claimed in claim 2 in which the two gear wheels have the same number of teeth and are of the same pitch diameter.

4. A gear wheel pump including in combination a casing having inlet and outlet ports, intermeshing driving and driven gear wheels extending with backlash across the casing between the ports and having teeth all of which make substantially fluid-tight seals with adjacent parts of the casing, the teeth of both gear wheels being of normal form with flanks extending to the tip surfaces of the teeth which tip surfaces make fluid-tight seals with the casing except that the teeth of the driven gear wheel are cropped by reducing the overall diameter of the driven gear wheel with respect to that of the normal gear wheel of the same number of teeth so that the sealing flanks of each pair of teeth do not come into sealing engagement with one another in their rotational movement until the mid point of the narrowest part of the gap representing back lash between the preceding pair of idle flanks in their rotational movement reaches or passes the plane which is common to the axis of rotation of the two gear wheels.

5. A gear wheel pump as claimed in claim 4 in which the two gear wheels have the same number of teeth and are of the same pitch diameter.

6. A gear wheel pump including in combination a casing having inlet and outlet ports, driving and driven gear wheels intermeshing with back lash within the casing and extending across the casing between the ports and each having teeth all of which make substantially fluid tight seals with the adjacent parts of the wall of the casing, the teeth of the driven gear wheel being true involute surfaces of the same pitch as those of the driving gear wheel and radially cropped at their ends with respect to the teeth of the driving gear wheel to conform to the circumference of a circle concentric with the center of rotation of the driven gear wheel so as to delay the point at which the sealing flanks of each pair of teeth come into engagement with one another in their rotational movement to a distance from the plane through the axes of said gears not greater than the distance of the point at which the sealing flanks of the preceding pair of teeth which are moving out of engagement have contact with each other on the opposite side of said plane, and thereby reduce or eliminate the compression of the fluid in the spaces between adjacent pairs of engaging sealing flanks.

7. A gear wheel pump as claimed in claim 6 in which the two gear wheels have the same number of teeth and are of the same pitch diameter.

EDWARD HARRY JOHNSON.

REFERENCES CITED

The following references are of record in the file of this patent:

UNITED STATES PATENTS

| Number | Name | Date |
|---|---|---|
| 884,812 | Gillmor et al. | Apr. 14, 1908 |
| 1,633,793 | Porst | June 28, 1927 |
| 1,686,867 | Kuhn | Oct. 9, 1928 |
| 1,712,095 | Schurr | May 7, 1929 |
| 1,728,529 | Butler | Sept. 17, 1929 |
| 1,813,875 | Fehr | July 7, 1931 |
| 1,861,708 | Miki | June 7, 1932 |
| 1,923,268 | Jensen | Aug. 22, 1933 |
| 1,976,227 | Howard | Oct. 9, 1934 |
| 2,159,744 | Maglott | May 23, 1939 |

FOREIGN PATENTS

| Number | Country | Date |
|---|---|---|
| 439,908 | Great Britain | Dec. 17, 1935 |
| 605,104 | Great Britain | July 15, 1948 |